(12) United States Patent
Semura et al.

(10) Patent No.: US 6,361,914 B1
(45) Date of Patent: Mar. 26, 2002

(54) RESIN BINDER COMPOSITION FOR NON-CONTACT FIXING PROCESS

(75) Inventors: Tetsuhiro Semura; Yoshihiro Ueno, both of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/670,574

(22) Filed: Sep. 27, 2000

(30) Foreign Application Priority Data

Sep. 27, 1999 (JP) .......................................... 11-273181

(51) Int. Cl.[7] .............................................. G03G 13/20
(52) U.S. Cl. ..................................... 430/124; 430/109.4
(58) Field of Search ........................ 430/108.4, 108.8, 430/108.9, 108.7, 109.4, 111.1, 122, 124

(56) References Cited

U.S. PATENT DOCUMENTS

| 5,723,246 A | * | 3/1998 | Aoki et al. | 430/109.4 |
| 5,908,727 A | * | 6/1999 | Kawaji et al. | 430/108.8 |
| 6,100,000 A | * | 8/2000 | Anno et al. | 430/111.1 |

FOREIGN PATENT DOCUMENTS

| JP | 05107805 A | 4/1993 |
| JP | 08087130 A | 4/1996 |

* cited by examiner

*Primary Examiner*—John Goodrow
(74) *Attorney, Agent, or Firm*—Birch, Stewart, Kolasch & Birch, LLP

(57) ABSTRACT

A resin binder composition for a non-contact fixing process comprising two or more polyesters having different softening points, wherein each of the polyesters is a resin obtained from an alcohol component consisting essentially of a compound represented by the formula (I):

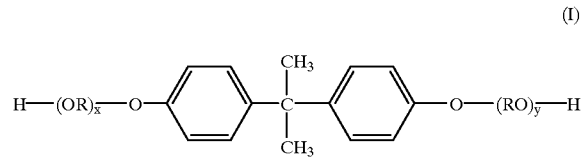

wherein R is an alkylene group having 2 or 3 carbon atoms; each of x and y is a positive number, wherein a sum of x and y is 1 to 16, and wherein at least a polyester having the highest softening point is a cross-linked polyester; a toner for a non-contacting fixing process comprising the resin binder composition, and a developer comprising the toner for a non-contacting fixing process; and a method for fixing the toner in a non-contact fixing process.

5 Claims, No Drawings

RESIN BINDER COMPOSITION FOR NON-CONTACT FIXING PROCESS

BACKGROUND OF THE INVENTION

1. Field of the Invention

The present invention relates to a resin binder composition for a non-contact fixing process used for developing electrostatic latent images formed in electrophotography, electrostatic recording method, electrostatic printing, and the like, a toner for a non-contact fixing process comprising the resin binder composition, a developer comprising the toner for a non-contact fixing process, and a method for fixing the toner in a non-contact fixing process.

2. Discussion of the Related Art

A non-contact fixing process includes a process in which light or heat energy is applied to a toner in a non-contacting state, thereby fixing the toner, such as a flash fixing or radiant (oven) fixing process, which has a feature in that the offset phenomenon and the deterioration of resolution, which are often found in contact-fixing, are not found. However, when the light or heat energy is deficient during fixing, the toner cannot be sufficiently melted, so that satisfactory fixing ability cannot be obtained. On the other hand, when the light or heat energy is too intensive, the viscosity of the toner drastically is lowered. When the surface tension acting on the toner exceeds the viscosity, the aggregation and migration of the toner at printed portion take place, so that there is generated a so-called "voids," which are white voids phenomenon on a fixed image, whereby the photographic density of the image is lowered. Therefore, toners using a specific resin binder are disclosed in Japanese Patent Laid-Open Nos. Hei 8-87130, Hei 5-107805, and the like, in view of eliminating these defects found in the non-contacting fixing process. However, further improvements in the environmental resistance and the storage ability are desired, even though the fixing ability and the void resistance are somewhat improved.

An object of the present invention is to provide a resin binder composition for a non-contact fixing process which effectively prevents the generation of voids in the non-contacting fixing process and is excellent in the environmental resistance and the storage ability as well as in the fixing ability.

Another object of the present invention is to provide a toner for a non-contacting fixing process comprising the resin binder composition, and a developer comprising the toner for a non-contacting fixing process.

Still another object of the present invention is to provide a method for fixing the toner in a non-contact fixing process.

These objects and other objects of the present invention will be apparent from the following description.

SUMMARY OF THE INVENTION

The present invention pertains to the following:

[1] a resin binder composition for a non-contact fixing process comprising two or more polyesters having different softening points, wherein each of the polyesters is a resin obtained from an alcohol component consisting essentially of a compound represented by the formula (I):

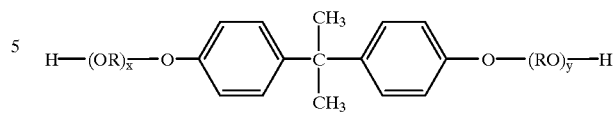

wherein R is an alkylene group having 2 or 3 carbon atoms; each of x and y is a positive number, wherein a sum of x and y is 1 to 16, and wherein at least a polyester having the highest softening point is a cross-linked polyester;

[2] a toner for a non-contact fixing process comprising the resin binder composition as defined above;

[3] a developer comprising the toner as defined above; and

[4] a method for fixing a toner in a non-contact fixing process, comprising applying the toner to a fixing device, wherein the toner comprises the resin binder composition defined above.

DETAILED DESCRIPTION OF THE INVENTION

The resin binder composition for a non-contact fixing process of the present invention comprises two or more polyesters having different softening points. Since the polyesters having different softening points are contained as mentioned above, the molecular weight distribution of the resin binder composition becomes wider, so that the generation of voids found generally in the non-contacting process can be effectively prevented, whereby the fixing ability can be improved. The resin binder composition of the present invention can be especially preferably used as a resin binder composition for flash fixing process among the non-contact fixing processes such as flash fixing or radiant (oven) fixing processes, from the viewpoint of energy efficiency.

A further great feature of the present invention resides in that all of the polyesters are obtained from an alcohol component consisting essentially of a compound represented by the formula (I):

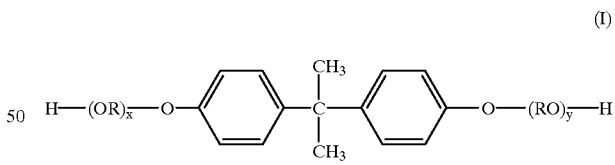

wherein R is an alkylene group having 2 or 3 carbon atoms; each of x and y is a positive number, wherein a sum of x and y is 1 to 16, preferably 1.5 to 5.0. Since the compound represented by the formula (I) is used as an alcohol component, a resin having low water-adsorbency is obtained, so that the environmental resistance of the resin is markedly improved. Also, since an aliphatic alcohol is not essentially used, the storage ability is improved. Here, the phrase "consisting essentially of a compound represented by the formula (I)" means that other compounds may be slightly contained in an amount so as not to hinder the object of the present invention.

Therefore, the polyester usable in the present invention, as mentioned above, is obtained by polycondensation of an alcohol component consisting essentially of a compound represented by the formula (I) with a carboxylic acid component. As the carboxylic acid component, dicarboxylic acid compounds may be used for the linear polyesters, and tricarboxylic or higher polycarboxylic acid compounds as well as the dicarboxylic acid compounds may be used for cross-linked polyesters.

The compound represented by the formula (I) includes bisphenol A of an alkylene oxide adduct, each of which has average moles added of 1 to 16, preferably 1.5 to 5.0, such as polyoxypropylene(2.2)-2,2-bis(4-hydroxyphenyl) propane and polyoxyethylene(2.2)-2,2-bis(4-hydroxyphenyl)propane. These compounds may be used alone or in admixture of two or more kinds.

The dicarboxylic acid compound includes phthalic acid compounds such as phthalic acid, isophthalic acid, and terephthalic acid; fumaric acid; maleic acid; adipic acid; and succinic acid compounds, which may be substituted by an aliphatic hydrocarbon group having 4 to 20 carbon atoms, such as dodecenylsuccinic acid or octylsuccinic acid, preferably substituted by an alkenyl group, acid anhydrides thereof, alkyl (1 to 8 carbon atoms) esters thereof, and the like. Among them, the phthalic acid compounds, the succinic acid compounds, acid anhydrides thereof and alkyl esters thereof are preferable.

The tricarboxylic or higher polycarboxylic acid compound includes trimellitic acid, pyromellitic acid, acid anhydrides thereof, alkyl(1 to 8 carbon atoms) esters thereof, and the like.

In the cross-linked polyester, the tricarboxylic or higher polycarboxylic acid compound is contained in an amount of preferably from 3 to 40% by mol, more preferably from 5 to 25% by mol, of the carboxylic acid component.

The polycondensation of the alcohol component with the carboxylic acid component is carried out, for instance, by the reaction at a temperature of from 180° to 250° C. in an inert gas atmosphere, using an esterification catalyst as occasion demands.

In the present invention, it is preferable that two or more of the polyesters having different softening points comprise at least one polyester having a softening point of 80° C. or more and less than 120° C. (low-softening point polyester), and at least one polyester having a softening point of 120° C. or more and 160° C. or less (high-softening point polyester).

It is desired that the softening point of the low-softening point polyester is 80° C. or more and less than 120° C., preferably 90° C. or more and 110° C. or less, and that the softening point of the high-softening point polyester is 120° C. or more and 160° C. or less, preferably 130° C. or more and 153° C. or less, from the viewpoints of the fixing ability and the storage ability. In addition, the glass transition temperature of the low-softening point polyester is preferably 50° C. or more, more preferably 55° C. or more, especially preferably 60° C. or more, and from the viewpoint of the storage ability, the glass transition temperature is more preferably 80° C. or less. Therefore, the glass transition temperature is preferably from 50° to 80° C., more preferably from 55° to 80° C., especially preferably from 60° to 80° C. Also, the glass transition temperature of the high-softening point polyester is preferably 60° C. or more, more preferably from 60° to 80° C.

The weight ratio of the low-softening point polyester to the high-softening point polyester (low-softening point polyester/high-softening point polyester) is preferably from 20/80 to 90/10, more preferably from 40/60 to 90/10.

As to the polyester usable in the present invention, as long as at least a polyester having the highest softening point is a cross-linked polyester, the remaining polyesters may be either a linear polyester or cross-inked polyester, and it is preferable that only the high-softening point polyester is a cross-linked polyester. When the polyester having the highest softening point is a cross-linked polyester, the void resistance is improved, thereby leading to improvement in the fixing ability.

The toner for a non-contact fixing process of the present invention comprises the resin binder composition of the present invention explained above, which may further comprise in appropriate amounts additives such as a colorant, a charge control agent, a releasing agent, an electric conductivity modifier, an extender, a reinforcing filler such as a fibrous substance, an antioxidant, an anti-aging agent, a fluidity improver, and a cleanability improver.

As the colorants, all of the dyes and pigments which are used as conventional colorants for toners can be used, and the colorant includes carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, and the like. These colorants may be used alone or in admixture of two or more kinds. The colorant is contained in an amount of preferably from 1 to 10 parts by weight, based on 100 parts by weight of the resin binder composition.

The toner of the present invention is not particularly limited, and includes pulverized toners, polymerization toners, encapsulated toners, and the like, preferably a pulverized toner obtained by kneading and pulverization method. As a general method, for instance, a resin binder, a colorant, and the like are homogeneously blended in a mixer such as a ball-mill, and thereafter the mixture is melt-kneaded by a seal-type kneader or a single-screw or twin-screw extruder, or the like, and the kneaded mixture is cooled, pulverized, and classified. Further, a fluidity improver or the like may be added to the toner surface as occasion demands. It is preferable that the toner obtained as described above has a weight-average particle size of from 3 to 15 $\mu$m.

The toner for a non-contact fixing process of the present invention may be used alone as a developer when a magnetite particulate is contained, or as a nonmagnetic one-component developer when a fine magnetite particulate is not contained, or as a two-component developer by mixing the toner with a carrier.

This toner can be suitably used for a fixing device utilizing a non-contact fixing process. The present invention also provides a method for fixing a toner utilizing the non-contact fixing process, preferably a flash fixing process.

EXAMPLES

Softening Point of Resin

The temperature at which one-half of resin flows out, when measured by using a flow tester of the "koka" type (Model "CFT-500D" manufactured by Shimadzu Corporation) [sample: 1 g, heating rate: 6° C./min, applied load: 1.96 MPa, nozzle: 1 mm diameter and a length of 1 mm].

Glass Transition Temperature of Resin

Determined at a heating rate of 10° C./min by using a differential scanning calorimeter ("DSC Model 210," manufactured by Seiko Instruments, Inc.).

Preparation Example for Polyesters

A 3-liter four-necked glass flask was charged with raw materials shown in Table 1 or 2 together with dibutyltin oxide as an esterificafion catalyst, and a thermometer, a stainless stirrer, a reflux condenser and a nitrogen inlet tube were attached thereto. The contents in the flask were heated in an electric mantle at 200° C. under nitrogen gas stream with sting, and reacted with a softening point as determined by ring-ball method as a tentative termination point, to give Resins A to F (linear polyesters) and Resins a to g (cross-linked polyesters). The softening point (Tm) and the glass transition temperature (Tg) for each resin are

TABLE 1

|  | Resin A | Resin B | Resin C | Resin D | Resin E | Resin F |
|---|---|---|---|---|---|---|
| BPA-PO[1] | 90 | 90 | 80 | 90 | 70 | 90 |
| BPA-EO[2] | 10 | 10 | 20 | 10 | 20 | 5 |
| Ethylene Glycol |  |  |  |  |  | 5 |
| Dipropylene Glycol |  |  |  |  |  |  |
| Propylene Glycol |  |  |  |  | 10 |  |
| Isophthalic Acid | 90 | 68 | 72 | 69 | 40 | 45 |
| Succinic Acid | 5 | 15 | 2 | 5 | 5 | 10 |
| Dimethyl Terephthalate |  |  |  | 30 | 52 | 40 |
| Tm (° C.) | 112.1 | 102.5 | 94.2 | 121.2 | 100.2 | 95.2 |
| Tg (° C.) | 62.1 | 59.2 | 59.2 | 67.2 | 49.2 | 56.5 |

[1] Propylene oxide adduct of bisphenol A (average number of moles added: 2.2 moles).
[2] Ethylene oxide adduct of bisphenol A (average number of moles added: 2.2 moles).
Remark: All amounts of the raw materials used are expressed in molar ratios.

TABLE 2

|  | Resin a | Resin b | Resin c | Resin d | Resin e | Resin f | Resin g |
|---|---|---|---|---|---|---|---|
| BPA-PO[1] | 70 | 80 | 80 | 80 | 95 | 40 | 75 |
| BPA-EO[2] | 30 | 20 | 20 | 20 | 5 | 40 | 20 |
| Dipropylene Glycol |  |  |  |  |  |  |  |
| Propylene Glycol |  |  |  |  | 20 |  | 5 |
| Isophthalic Acid | 55 | 70 | 60 | 65 | 80 | 30 | 48 |
| Succinic Acid | 5 | 5 | 15 | 7 | 5 | 10 | 5 |
| Dimethyl Terephthalate |  |  |  |  |  | 45 | 40 |
| Trimellitic Anhydride | 18 | 17 | 20 | 10 | 8 | 10 | 5 |
| Tm (° C.) | 155.2 | 149.8 | 144.5 | 117.5 | 96.2 | 142.1 | 122.2 |
| Tg (° C.) | 68.5 | 72.1 | 65.3 | 68.2 | 61.1 | 57.8 | 56.1 |

[1] Propylene oxide adduct of bisphenol A (average number of moles added: 2.2 moles).
[2] Ethylene oxide adduct of bisphenol A (average number of moles added: 2.2 moles).
Remark: All amounts of the raw materials used are expressed in molar ratios.

Examples 1 to 9 and Comparative Examples 1 to 6

One-hundred parts by weight of a resin binder composition composed of the resins listed in Table 3 as resin binders, 7 parts by weight of carbon black "#44" (manufactured by Mitsubishi Kasei Corporation) as a colorant, and 3 parts by weight of "Bontron N-01" (manufactured by Orient Chemical Co., Ltd.) as a positively chargeable charge controlling agent were sufficiently mixed with a Henschel mixer. Thereafter, the mixture was melt-kneaded with a twin-screw extruder, and after cooling the mixture, the mixture was pulverized and classified, to give each toner having a weight-average particle size of 11 μm.

Example 10

The same procedures as in Example 1 were carried out except that the resin binder composition composed of the resins listed in Table 3 as a resin binder, and that 3 parts by weight of "Bontron S-34" (manufactured by Orient Chemical Co., Ltd.) as a negatively chargeable charge controlling agent was used in place of the positively chargeable charge controlling agent, to give a toner having a weight-average particle size of 11 μm.

Test Example 1

A developer was prepared by mixing 4 parts by weight of each of the resulting toners with 96 parts by weight of "TEFV 200/300" (iron powder, commercially available from Powder Tech Kabushiki Kaisha) as a carrier. The resulting developer was loaded on a commercially available laser printer employing flash fixing process to develop images. The void resistance, the fixing ability and the environmental resistance were evaluated by the following methods. The results are shown in Table 3.

(1) Void Resistance

The generation of voids caused by explosive fixing was observed with naked eyes, and evaluated in accordance with the following evaluation criteria:

[Evaluation Criteria]

○: No generation of voids

×: Generation of voids found (2) Fixing Ability

The fixing ratio was determined by placing a load of 500 g on a sand-rubber eraser having a bottom area of 15 mm×7.5 mm on an initial fixed image obtained by fixing at a fixing speed of 100 mm/seconds at a temperature of 180° C., moving the loaded eraser on the image backward and forward five times, measuring the optical reflective density of the image before or after the eraser treatment with a reflective densitometer "RD-915" manufactured by Macbeth Process Measurements Co., and then calculating the fixing ratio by the following equation.

$$\text{Fixing Ratio} = \frac{\text{Optical Density After Eraser Treatment}}{\text{Optical Density Before Eraser Treatment}} \times 100$$

The fixing ability was evaluated in accordance with the following evaluation criteria:

[Evaluation Criteria]

◎: The fixing ratio exceeding 80%;

○: The fixing ratio being from 70 to 80%, inclusive.

×: The fixing ratio being less than 70%.

(3) Environmental Resistance

A 10000 sheet continuous copying was carried out under ordinary environmental conditions (23° C., 50% RH), under high-temperature, high-humidity environmental conditions (35° C., 85% RH), and under low-temperature, low-humidity environmental conditions (10° C., 15% RH), respectively. The triboelectric charges for each toner during continuous copying were measured, and the average value of the changing ratio of the triboelectric charges under high-temperature, high-humidity environmental conditions to the triboelectric charges under ordinary conditions and the triboelectric charges under low-temperature, low-humidity environmental conditions to the triboelectric charges under ordinary conditions was calculated as follows, namely:

$$\frac{\text{changing ratio of triboelectric charges under high-temperature, high-humidity environment conditions} + \text{changing ratio of triboelectric charges under low-temperature, low-humidity environment conditions}}{2}$$

and the environmental resistance was evaluated in accordance with the following criteria:

[Evaluation Criteria]
⊚ Average value being less than 20%, especially favorable in practical use.
○: Average value being from 20 to 30%, inclusive, without any problem in practical use.
×: Average value being exceeding 30%, making its practical use impossible.

Test Example 2

A cylindrical stainless vessel having a height of 12 mm and a radius of 30 mm was charged with 5.0 g of a toner, and the toner was allowed to stand at 50° C. for 72 hours. Thereafter, the resulting toner was classified with a sieve having a sieve-opening of 500 μm (30-mesh) sieve-opening, and the weight of the passed toner was determined. The storage ability was evaluated in accordance with the following criteria. The results are shown in Table 3.

[Evaluation Criteria]
⊚: Ratio of passed toner, to the charged toner, exceeding 90%.
○: Ratio of passed toner being from 80 to 90%, inclusive.
×: Ratio of passed toner less than 80%.

TABLE 3

| Resins and Amount Used | Void Resistance | Fixing Ability | Environmental Resistance | Storage Ability |
|---|---|---|---|---|
| Ex. No. | | | | |
| 1 Resin A/50 Resin b/50 | ○ | ○ | ⊚ | ⊚ |
| 2 Resin C/50 Resin b/50 | ○ | ⊚ | ⊚ | ○ |
| 3 Resin e/50 Resin b/50 | ○ | ○ | ○ | ⊚ |
| 4 Resin B/50 Resin b/50 | ○ | ⊚ | ⊚ | ⊚ |
| 5 Resin B/90 Resin b/10 | ○ | ⊚ | ⊚ | ⊚ |
| 6 Resin B/20 Resin b/80 | ○ | ○ | ⊚ | ⊚ |
| 7 Resin e/30 Resin d/70 | ○ | ○ | ⊚ | ⊚ |
| 8 Resin e/55 Resin a/45 | ○ | ○ | ○ | ⊚ |
| 9 Resin e/70 Resin c/30 | ○ | ○ | ○ | ⊚ |
| 10 Resin e/70 Resin c/30 | ○ | ○ | ○ | ⊚ |
| Comp. Ex. No. | | | | |
| 1 Resin F/50 Resin g/50 | ○ | ○ | × | × |
| 2 Resin C/50 Resin f/50 | ○ | ⊚ | × | × |
| 3 Resin E/60 Resin c/40 | ○ | ⊚ | × | × |
| 4 Resin B/100 | × | × | ⊚ | ○ |
| 5 Resin a/100 | ○ | × | ⊚ | ⊚ |
| 6 Resin B/60 Resin D/40 | × | × | ⊚ | ⊚ |

Remark) Amount used is expressed by parts by weight.

It is clear from the above results that the toners of Examples 1 to 10 are excellent in all of the properties of the void resistance, the fixing ability, the environmental resistance, and the storage ability. On the other hand, the toners of Comparative Examples 1 to 3 where a compound other than that represented by the formula (I) is used as an alcohol component are poor in the environmental resistance and the storage ability; the toners of Comparative Examples 4 and 5 where a resin binder composition composed of a single resin is used have impaired void resistance and/or fixing ability; and the toner of Comparative Example 6 where a cross-linked polyester is not used is poor in the void resistance and the fixing ability.

According to the present invention, there can be provided a resin binder composition for a non-contact fixing process which effectively prevents the generation of voids in the non-contact fixing process, thereby being excellent not only in the fixing ability but also in the environmental resistance and the storage ability; a toner for a non-contact fixing process comprising such a resin binder composition; a developer comprising such a toner, and a method for fixing the toner in a non-contact fixing process.

What is claimed is:

1. A method for fixing a toner in a non-contact fixing process, comprising applying the toner to a fixing device, wherein the toner comprises a resin binder composition comprising two or more polyesters having different softening points, wherein each of the polyesters is a resin obtained from an alcohol component consisting essentially of a compound represented by the formula (I):

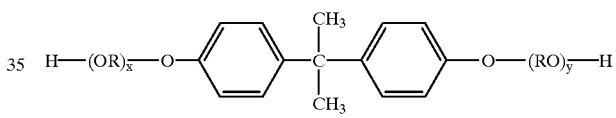

(I)

wherein R is an alkylene group having 2 or 3 carbon atoms; each of x and y is a positive number, wherein a sum of x and y is 1 to 16, and wherein at least a polyester having the highest softening point is a cross-linked polyester.

2. The method according to claim 1, wherein said non-contact fixing process is a flash fixing process.

3. The method according to claim 1, wherein the polyesters comprise at least one polyester having a softening point of 80° C. or more and less than 120° C. (low-softening point polyester), and at least one polyester having a softening point of 120° C. or more and 160° C. or less (high-softening point polyester).

4. The method according to claim 3, wherein a weight ratio of a low-softening point polyester to a high-softening point polyester (low-softening point polyester/high-softening point polyester) is from 20/80 to 90/10.

5. The method according to claim 1, wherein the cross-linked polyester is a polyester produced by use of a tricarboxylic or higher polycarboxylic acid compound in an amount of from 3 to 40% by mol of a carboxylic acid component.

* * * * *